(12) United States Patent
Carreon et al.

(10) Patent No.: US 11,642,848 B2
(45) Date of Patent: May 9, 2023

(54) TEMPERATURE RESPONSIVE RESIN CASSETTES FOR ADDITIVE MANUFACTURING

(71) Applicant: Carbon, Inc., Redwood City, CA (US)

(72) Inventors: Bernard Carreon, Berkeley, CA (US); Rene Lopez, Redwood City, CA (US)

(73) Assignee: Carbon, Inc., Redwood City, CA (US)

( * ) Notice: Subject to any disclaimer, the term of this patent is extended or adjusted under 35 U.S.C. 154(b) by 2 days.

(21) Appl. No.: 17/027,975

(22) Filed: Sep. 22, 2020

(65) Prior Publication Data

US 2021/0086448 A1 Mar. 25, 2021

Related U.S. Application Data

(60) Provisional application No. 62/904,212, filed on Sep. 23, 2019.

(51) Int. Cl.
| | |
|---|---|
| *B29C 64/255* | (2017.01) |
| *B33Y 10/00* | (2015.01) |
| *B33Y 30/00* | (2015.01) |
| *B29C 64/321* | (2017.01) |
| *B33Y 40/00* | (2020.01) |
| *B29C 64/393* | (2017.01) |
| *B33Y 50/02* | (2015.01) |
| *B29C 64/245* | (2017.01) |
| *B29C 64/129* | (2017.01) |

(52) U.S. Cl.
CPC .......... *B29C 64/255* (2017.08); *B29C 64/129* (2017.08); *B29C 64/245* (2017.08); *B29C 64/321* (2017.08); *B29C 64/393* (2017.08); *B33Y 10/00* (2014.12); *B33Y 30/00* (2014.12); *B33Y 40/00* (2014.12); *B33Y 50/02* (2014.12)

(58) Field of Classification Search
CPC ... B29C 64/124; B29C 64/129; B29C 64/135; B29C 64/255; B29C 64/245; B33Y 10/00; B33Y 30/00
See application file for complete search history.

(56) References Cited

U.S. PATENT DOCUMENTS

| | | | | |
|---|---|---|---|---|
| 2011/0001950 | A1* | 1/2011 | DeVoe | G03F 7/70525 355/67 |
| 2016/0279895 | A1* | 9/2016 | Marjanovic | B23K 26/389 |
| 2019/0039290 | A1* | 2/2019 | Lebrun | B33Y 70/00 |

FOREIGN PATENT DOCUMENTS

WO  WO-2018143904 A1 *  8/2018

* cited by examiner

*Primary Examiner* — Joseph S Del Sole
*Assistant Examiner* — Jamel M Nelson
(74) *Attorney, Agent, or Firm* — Myers Bigel, P.A.

(57) ABSTRACT

A resin cassette for an additive manufacturing apparatus includes (a) a light transmissive window; (b) a circumferential frame connected to and surrounding the window, the window and frame together forming a well configured to receive a light polymerizable resin; and (c) a fluorophore layer in or on the window.

16 Claims, 1 Drawing Sheet

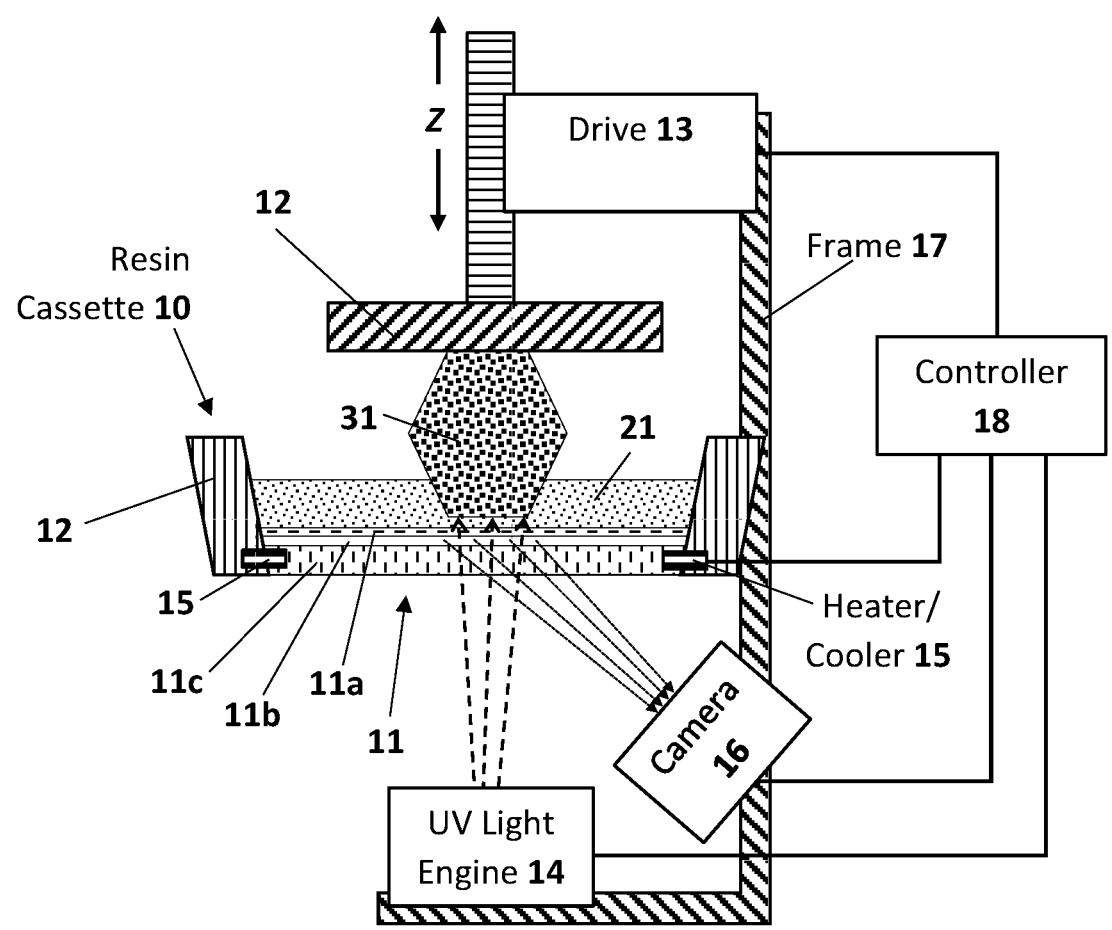

TEMPERATURE RESPONSIVE RESIN CASSETTES FOR ADDITIVE MANUFACTURING

RELATED APPLICATIONS

This application claims priority to U.S. Provisional Application Ser. No. 62/904,212, filed Sep. 23, 2019, the disclosure of which is hereby incorporated by reference in its entirety.

FIELD OF THE INVENTION

The present invention concerns apparatus for producing objects by additive manufacturing, and methods of monitoring of heat patterns during such production.

BACKGROUND OF THE INVENTION

A group of additive manufacturing techniques sometimes referred to as "stereolithography" creates a three-dimensional object by the sequential polymerization of a light polymerizable resin. Such techniques may be "bottom-up" techniques, where light is projected into the resin on the bottom of the growing object through a light transmissive window, or "top down" techniques, where light is projected onto the resin on top of the growing object, which is then immersed downward into the pool of resin.

The recent introduction of a more rapid stereolithography technique known as continuous liquid interface production (CLIP), coupled with the introduction of "dual cure" resins for additive manufacturing, has expanded the usefulness of stereolithography from prototyping to manufacturing (see, e.g., U.S. Pat. Nos. 9,211,678; 9,205,601; and 9,216,546 to DeSimone et al.; and also in J. Tumbleston, D. Shirvanyants, N. Ermoshkin et al., Continuous liquid interface production of 3D Objects, *Science* 347, 1349-1352 (2015); see also Rolland et al., U.S. Pat. Nos. 9,676,963, 9,453,142 and 9,598,606).

The photopolymerization reaction in stereolithography is exothermic, and as the processes become more rapid, the amount of heat generated increases. Some heat generation can be favorable (as a warmer resin is less viscous and flows more easy), but too much heat, or irregular heat patterns, can cause damage to some windows, indicate a problem in the production process, or lead to warping or mechanical problems in the part being produced. It would be useful to have a way to monitor or map heat generation at the region where polymerization is occurring in stereolithography, but infrared cameras—the usual way to monitor heat patterns in such systems—can have difficulties penetrating through thicker windows to detect temperature patterns in the relevant areas (in the resin or close to the resin), particularly when smaller temperature fluctuations are involved. Accordingly, there is a need for new approaches to sensing and mapping resin temperatures during bottom-up stereolithography.

SUMMARY OF THE INVENTION

In some embodiments, a resin cassette for an additive manufacturing apparatus includes (a) a light transmissive window; (b) a circumferential frame connected to and surrounding the window, the window and frame together forming a well configured to receive a light polymerizable resin; and (c) a fluorophore layer in or on the window.

In some embodiments, the fluorophore comprises a fluorone dye (e.g., a rhodamine, such as rhodamine B or rhodamine 6G).

In some embodiments, the fluorophore fluoresces in the visible range (i.e., emits light at a peak emission wavelength between 380 and 740 nanometers).

In some embodiments, the window has a bottom surface, and the fluorophore layer is on the bottom surface (and preferably, wherein the window has a total thickness of not more than 100 microns).

In some embodiments, the window comprises a sandwich configuration of at least a top portion and a bottom portion (e.g., a bottom portion having a thickness of at least 1, 2 or 3 millimeters), and the fluorophore layer is either between the top and bottom portion, or included in the top portion.

In some embodiments, the window, or in particular embodiments the window bottom portion, comprises glass, sapphire, quartz, or transparent aluminum (ALON).

In some embodiments, the top portion comprises a polymer (e.g., an oxygen-permeable polymer such as an amorphous fluoropolymer), optionally with the fluorophore dispersed therein.

In some embodiments, the window further comprises at least one intermediate layer (e.g., a second polymer layer, such as a polydimethylsiloxane (PDMS) layer) between the top portion and the bottom portion, and the fluorophore layer is distributed in the at least one of the at least one intermediate layer.

In some embodiments, a bottom-up additive manufacturing apparatus, comprising: (a) a frame; (b) a resin cassette as described herein operatively associated with the frame; (c) a light source positioned below the resin cassette and positioned for projecting patterned light through the window; (d) a carrier platform positioned above the window and operatively associated with the frame; (e) a drive operatively associated with the carrier and the frame and configured for advancing the carrier platform and the resin cassette away from one another; and (f) a camera associated with the frame and positioned to detect fluorescence from the fluorophore layer.

In some embodiments, a camera is configured to detect regional variations in fluorescence across the window (i.e., a fluorescence map in both the X and Y directions).

In some embodiments, a heater, a cooler, or both a heater and a cooler is operatively associated with the window.

In some embodiments, a method of making an object from a light polymerizable resin and a data file (e.g., a CAD file, an .stl file, etc.), includes (a) filling a resin cassette in an apparatus as described herein with the resin; (b) producing the object from the data file and the resin by intermittently and/or continuously exposing the resin to patterned light from the light source to photopolymerize the resin, while advancing the carrier platform and the resin cassette away from one another; and (c) detecting fluorescence from the fluorescence layer during the producing step, with the intensity of the fluorescence corresponding to the temperature of the window.

In some embodiments, the detecting step comprises detecting regional variations of fluorescence across the window (i.e., a fluorescence map or heat map in both the X and Y directions).

In some embodiments, the detecting step is carried out a plurality of times during the producing step.

In some embodiments, the resin includes a photocatalytic system, and wherein the fluorophore has an absorption at the peak absorption wavelength of the photocatalytic system sufficiently low to avoid undue interference with photopolymerization of the light polymerizable resin during the producing step (e.g., absorbs not more than 1, 5, 10 or 20 percent the peak absorbance level of the photocatalytic system).

In some embodiments, the method further comprises (d) saving the detected fluorescence data in association with a unique identifier for the produced object and/or the data file in a storage media (locally or on the cloud); and/or (e) modifying at least one parameter of the producing step in response to the detected fluorescence.

The foregoing and other objects and aspects of the present invention are explained in greater detail in the drawings herein and the specification set forth below. The disclosures of all United States patent references cited herein are to be incorporated herein by reference.

BRIEF DESCRIPTION OF THE DRAWINGS

FIGURE is a schematic illustration of one embodiment of a resin cassette and apparatus as described herein.

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations of one or more of the associated listed items, as well as the lack of combinations when interpreted in the alternative ("or").

1. Resins and Additive Manufacturing Steps.

Resins for additive manufacturing are known and described in, for example, U.S. Pat. Nos. 9,211,678; 9,205, 601; and 9,216,546 to DeSimone et al. In addition, dual cure resins useful for carrying out some embodiments of the present invention are known and described in U.S. Pat. Nos. 9,676,963, 9,453,142 and 9,598,606 to Rolland et al., and in U.S. Pat. No. 10,316,213 to Arndt et al. Particular examples of suitable dual cure resins include, but are not limited to, Carbon Inc. medical polyurethane, elastomeric polyurethane, rigid polyurethane, flexible polyurethane, cyanate ester, epoxy, and silicone dual cure resins, all available from Carbon, Inc., 1089 Mills Way, Redwood City, Calif. 94063 USA.

Apparatus for carrying out bottom-up stereolithography, which can be adapted or improved as described herein, are known and described in, for example, U.S. Pat. No. 5,236, 637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the additive manufacturing step is carried out by one of the family of methods sometimes referred to as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, *Science* 347, 1349-1352 (2015); and in R. Janusziewcz et al., Layerless fabrication with continuous liquid interface production, *Proc. Natl. Acad. Sci. USA* 113, 11703-11708 (Oct. 18, 2016). Other examples of methods and apparatus for carrying out particular embodiments of CLIP include, but are not limited to: Batchelder et al., US Patent Application Pub. No. US 2017/0129169 (May 11, 2017); Sun and Lichkus, US Patent Application Pub. No. US 2016/0288376 (Oct. 6, 2016); Willis et al., US Patent Application Pub. No. US 2015/0360419 (Dec. 17, 2015); Lin et al., US Patent Application Pub. No. US 2015/0331402 (Nov. 19, 2015); D. Castanon, S Patent Application Pub. No. US 2017/0129167 (May 11, 2017). B. Feller, US Pat App. Pub. No. US 2018/0243976 (published Aug. 30, 2018); M. Panzer and J. Tumbleston, US Pat App Pub. No. US 2018/0126630 (published May 10, 2018); and K. Willis and B. Adzima, US Pat App Pub. No. US 2018/0290374 (Oct. 11, 2018).

2. Additive Manufacturing Apparatus

Referring the FIGURE, an additive manufacturing apparatus according to embodiments of the present invention is illustrated. As shown in the FIGURE, a bottom-up additive manufacturing apparatus includes (a) a frame (17); b) a resin cassette (10); (c) a light source (14) positioned below the resin cassette (10) and positioned for projecting patterned light through a window (11) of the resin cassette (10); (d) a carrier platform (12) positioned above the window (11) and operatively associated with the frame (17); and (e) a drive (13) operatively associated with a carrier platform (12) and the frame (17) and configured for advancing the carrier platform (12) and the resin cassette (10) away from one another. Objects 31 may be produced on the carrier platform (12) from resin 21 in the resin cassette (10). The apparatus may further include a heater/cooler (15), a controller (18), and a UV light engine (14). The UV light engine (14) is configured to project patterned light through the transparent window (11) to thereby cure the resin 21 in an additive manufacturing process to produce the object (31) on the carrier platform (12).

As discussed herein, the window (11) may include a fluorophore layer, and the apparatus may include a camera (16), which is associated with (e.g., mounted on) the frame (17). The camera (16) is positioned to detect fluorescence from the fluorophore layer.

The controller (18) may be configured to control the projections of the UV light engine (14), the movement of the carrier platform (12) in the Z direction away from the resin cassette (10), the camera (16) and/or the heater/cooler (15).

3. Resin Cassettes and Windows Thereof

As illustrated in the FIGURE, a resin cassette (10) for an additive manufacturing apparatus includes a light transmissive window (11) and a circumferential frame (12) connected to and surrounding the window (11). The window (11) and frame (12) together form a well configured to receive a light polymerizable resin (21). A fluorophore layer is in or on the window.

The fluorophore may include a fluorone dye (e.g., a rhodamine, such as rhodamine B or rhodamine 6G). The fluorophore fluoresces in the visible range (i.e., emits light at a peak emission wavelength between 380 and 740 nanometers).

As illustrated, the window (11) includes various layers, such as a sandwich configuration of a top portion (11a), a middle portion (11b) and a bottom portion (11c) (e.g., a bottom portion having a thickness of at least 1, 2 or 3 millimeters). The fluorophore layer in or one of the layers (11a, 11b, 11c). For example, the florophore layer may be either between the top portion (11a) and the bottom portion (11c) or included in the top portion (11a). In some embodiments, the fluorophore layer is on the bottom surface (11c). In some embodiments, the window (11) has a total thickness of not more than 100 microns.

In some embodiments, the window (11), or in some embodiments the window bottom portion (11c), comprises glass, sapphire, quartz, or transparent aluminum (ALON).

In some embodiments, the top portion (11a) comprises a polymer (e.g., an oxygen-permeable polymer such as an amorphous fluoropolymer), optionally with the fluorophore dispersed therein.

In some embodiments, the at least one intermediate layer (11b) (e.g., a second polymer layer, such as a polydimethylsiloxane (PDMS) layer) between the top portion (11a) and the bottom portion (11c), includes the fluorophore layer distributed therein.

Although the window (11) is illustrated with three layers (11a, 11b, 11c), it should be understood that the fluorophore layer may be incorporated into windows having various configurations with additional layers or on a single layer window or in a window configuration having only two layers. In some embodiments, the intermediate layer (11b) may include additional layers.

In some embodiments, the camera (16) is configured to detect regional variations in fluorescence across the window (11) (i.e., a fluorescence map in both the X and Y directions).

4. Methods of Operation

In some embodiments, a method of making the object (31) from a light polymerizable resin (21) and a data file (e.g., a CAD file, an .stl file, etc.), includes filling the resin cassette (10) with resin (21) and producing the object (31) from the data file and the resin (21) by intermittently and/or continuously exposing the resin (21) to patterned light from the light source of the UV light engine (14) to photopolymerize the resin (21), while advancing the carrier platform (12) and the resin cassette (10) away from one another. Fluorescence from the fluorescence layer may be detected during the producing step, with the intensity of the fluorescence corresponding to a temperature of the window (11). In some embodiments, variations of fluorescence may be detected across the window, such as to produce a fluorescence map or heat map in both the X and Y directions.

In some embodiments, fluorescence detecting by the camera (16) is carried out a plurality of times during the production of the object (31).

In some embodiments, the resin (21) includes a photocatalytic system, and the fluorophore has an absorption at the peak absorption wavelength of the photocatalytic system that is sufficiently low to avoid undue interference with photopolymerization of the light polymerizable resin during production of the object (31) (e.g., the fluorophore absorbs not more than 1, 5, 10 or 20 percent the peak absorbance level of the photocatalytic system).

In some embodiments, the detected fluorescence data is saved or stored in association with a unique identifier for the produced object (31) and/or the data file is stored in a storage media (locally or on the cloud). In some embodiments, at least one parameter of the production of the object (31) may be modified in response to the detected fluorescence.

The apparatus can include heaters and/or coolers (15) operatively associated with the window (11) and the controller (18). Any suitable devices can be used, including resistive heaters, Peltier coolers, infrared heaters, etc., including combinations thereof. The heaters/coolers are preferably directly included in the resin cassette, preferably in direct contact with the window itself, or in the case of infrared heaters (not shown) can be positioned to project into the resin through the window.

As noted above, the process may further include: (d) saving the detected fluorescence data in association with a unique identifier for the produced object and/or the data file used to produce the object in a storage media (locally or on the cloud); and/or (e) modifying at least one parameter of the producing step in response to the detected fluorescence These steps may be implemented in any of a variety of ways, including but not limited to: reducing light intensity in exposure regions where heat is greater than expected (in this or a subsequent print of the same object (e.g., as defined by a data file such as a CAD file or stl file for that object)); increasing light intensity in exposure regions where heat is less than expected (in this or a subsequent print of the same object); slowing print speed when heat is greater than expected (in this or a subsequent print of the same object); speeding print speed when heat is less than expected (in this or a subsequent print of the same object); saving the detected fluorescence in association with a unique identifier for the object and/or the data file from which the object is produced; reducing heater output, and/or increasing cooler activity, when heat is greater than desired; increasing heater output, and/or reducing cooler activity, when heat is less than desired; ceasing print when significantly less heat is generated or when the heat map does not match the expected heat profile (indicating the object has fallen off or partially detached from the carrier platform, an exposure slice was missed, or the like); ceasing print when the detected fluorescence is so different from what is expected that it indicates an incorrect resin, or a defective resin, has been placed in the resin cassette; correcting part geometry by (in this print or a subsequent print): by increasing exposure regions where parts are too small or decrease exposure regions where parts are too big as indicated by the detected fluorescence heat map.

Accordingly the temperature and/or temperature gradient of the window may be recorded and/or monitored using the detected fluorescence heat map. In some embodiments, the heaters/coolers (15) of the window (11) may be operated based on the detected fluorescence heat map.

The foregoing is illustrative of the present invention, and is not to be construed as limiting thereof. The invention is defined by the following claims, with equivalents of the claims to be included therein.

We claim:

1. A resin cassette for an additive manufacturing apparatus, comprising:
   (a) a light transmissive window;
   (b) a circumferential frame connected to and surrounding said window, said window and frame together forming a well configured to receive a light polymerizable resin; and
   (c) a fluorophore layer in or on said window.

2. The cassette of claim 1, wherein said fluorophore layer comprises a fluorone dye.

3. The cassette of claim 2, wherein said fluorone dye comprises a rhodamine.

4. The cassette of claim 1, wherein said fluorophore layer comprises a fluorophore that fluoresces in the visible range to emit light at a peak emission wavelength between 380 and 740 nanometers.

5. The cassette of claim 1, wherein the window has a bottom surface, and said fluorophore layer is on said bottom surface.

6. The cassette of claim 1, wherein said window comprises a sandwich configuration of at least a top portion and a bottom portion, and said fluorophore layer is either between said top and bottom portion, or included in said top portion.

7. The cassette of claim 1, wherein said window comprises glass, sapphire, quartz, or transparent aluminum (ALON).

8. The cassette of claim 6, wherein said top portion comprises an oxygen-permeable polymer.

9. The cassette of claim 8, wherein said top portion comprises a fluorophore dispersed therein.

10. The cassette of claim 6, wherein said window further comprises at least one intermediate layer between said top portion and said bottom portion, and said fluorophore layer is distributed in said at least one intermediate layer.

11. A bottom-up additive manufacturing apparatus, comprising:
(a) a frame;
(b) a resin cassette operatively associated with said frame, said resin cassette comprising:
   (i) a light transmissive window;
   (ii) a circumferential frame connected to and surrounding said window, said window and frame together forming a well configured to receive a light polymerizable resin; and
   (iii) a fluorophore layer in or on said window;
(c) a light source positioned below said resin cassette and positioned for projecting patterned light through said window;
(d) a carrier platform positioned above said window and operatively associated with said frame;
(e) a drive operatively associated with said carrier and said frame and configured for advancing said carrier platform and said resin cassette away from one another; and
(f) a camera associated with said frame and positioned to detect fluorescence from said fluorophore layer.

12. The apparatus of claim 11, wherein said camera is configured to detect regional variations in fluorescence across said window.

13. The apparatus of claim 11, further comprising a heater, a cooler, or both a heater and a cooler operatively associated with said window.

14. The apparatus of claim 11, wherein said fluorophore layer comprises a fluorone dye.

15. The apparatus of claim 11, further comprising a controller configured to determine a temperature of the window based on an intensity of the fluorescence of the fluorophore.

16. The apparatus of claim 11, wherein the camera is configured to produce a heat map in response to variations of fluorescence detected across the window.

* * * * *